US010780305B2

(12) United States Patent
Xie et al.

(10) Patent No.: US 10,780,305 B2
(45) Date of Patent: Sep. 22, 2020

(54) ORGANOSILOXANE COMPOUNDS AS ACTIVE INGREDIENTS IN FLUORINE FREE FIRE SUPPRESSION FOAMS

(71) Applicant: TYCO FIRE PRODUCTS LP, Lansdale, PA (US)

(72) Inventors: Yuan Xie, Marinette, WI (US); Amy J. Wirth, Menominee, MI (US); Philip J. Karjala, Marinette, WI (US)

(73) Assignee: Tyco Fire Products LP, Lansdale, PA (US)

( * ) Notice: Subject to any disclaimer, the term of this patent is extended or adjusted under 35 U.S.C. 154(b) by 137 days.

(21) Appl. No.: 16/086,250

(22) PCT Filed: Mar. 16, 2017

(86) PCT No.: PCT/US2017/022776
§ 371 (c)(1),
(2) Date: Sep. 18, 2018

(87) PCT Pub. No.: WO2017/161162
PCT Pub. Date: Sep. 21, 2017

(65) Prior Publication Data
US 2020/0171334 A1 Jun. 4, 2020

Related U.S. Application Data

(60) Provisional application No. 62/310,500, filed on Mar. 18, 2016.

(51) Int. Cl.
| | | |
|---|---|---|
| *A62D 1/02* | (2006.01) | |
| *C08G 77/392* | (2006.01) | |
| *A62C 99/00* | (2010.01) | |
| *C07F 7/08* | (2006.01) | |
| *C08G 77/46* | (2006.01) | |

(52) U.S. Cl.
CPC ........ *A62D 1/0071* (2013.01); *A62C 99/0036* (2013.01); *C07F 7/0838* (2013.01); *C07F 7/0889* (2013.01); *C08G 77/392* (2013.01); *C08G 77/46* (2013.01)

(58) Field of Classification Search
CPC .................................................. C07F 7/0838
See application file for complete search history.

(56) References Cited

U.S. PATENT DOCUMENTS

| | | |
|---|---|---|
| 3,047,619 A | 7/1962 | Brace |
| 3,257,407 A | 6/1966 | Brace |
| 3,258,423 A | 6/1966 | Tuve et al. |
| 3,457,172 A | 7/1969 | Stewart et al. |
| 3,562,156 A | 2/1971 | Francen |
| 3,579,446 A | 5/1971 | Kroke et al. |
| 3,621,059 A | 11/1971 | Bartlett |
| 3,621,917 A | 11/1971 | Rosen et al. |
| 3,655,555 A | 4/1972 | Rossmy et al. |
| 3,661,776 A | 5/1972 | Fletcher et al. |
| 3,677,347 A | 7/1972 | Rosen et al. |
| 3,759,981 A | 9/1973 | Hager et al. |
| 3,772,195 A | 11/1973 | Francen |
| 3,772,199 A | 11/1973 | Tamai et al. |
| 3,789,265 A | 1/1974 | Holz et al. |
| 3,828,085 A | 8/1974 | Price et al. |
| 3,839,425 A | 10/1974 | Bartlett et al. |
| 3,849,315 A | 11/1974 | Chiesa, Jr. |
| 3,923,649 A | 12/1975 | Sparham et al. |
| 3,941,708 A | 3/1976 | Gentit et al. |
| 3,952,075 A | 4/1976 | Nakamura et al. |
| 3,957,657 A | 5/1976 | Chiesa, Jr. |
| 3,957,658 A * | 5/1976 | Chiesa, Jr. ........... A62D 1/0085 252/3 |
| 3,963,776 A | 6/1976 | Middleton |
| 4,038,198 A | 7/1977 | Wagner et al. |
| 4,042,522 A | 8/1977 | Falk |
| 4,049,556 A | 9/1977 | Tujimoto et al. |
| 4,060,132 A | 11/1977 | Chiesa, Jr. |
| 4,060,489 A | 11/1977 | Chiesa, Jr. |
| 4,069,158 A | 1/1978 | Bertocchio et al. |
| 4,090,976 A | 5/1978 | Dehollander et al. |
| 4,099,574 A | 7/1978 | Cooper et al. |
| 4,149,599 A | 4/1979 | Chiesa, Jr. |
| 4,203,850 A | 5/1980 | Wirtz et al. |
| 4,209,407 A | 6/1980 | Schuierer et al. |
| 4,357,473 A * | 11/1982 | Knollmueller ........ C07F 7/0876 556/416 |
| 4,387,032 A | 6/1983 | Chiesa, Jr. |
| 4,536,298 A | 8/1985 | Kamei et al. |
| 4,795,590 A | 1/1989 | Kent et al. |
| 5,085,786 A | 2/1992 | Alm et al. |
| 5,207,932 A | 5/1993 | Norman et al. |
| 5,218,021 A | 6/1993 | Clark et al. |
| 5,391,721 A | 2/1995 | Hanen et al. |
| 5,616,273 A | 4/1997 | Clark et al. |
| 5,750,043 A | 5/1998 | Clark |
| 5,820,776 A | 10/1998 | Hansen et al. |
| 6,231,778 B1 | 5/2001 | Hansen |
| 6,436,306 B1 | 8/2002 | Jennings |
| 6,599,872 B1 | 7/2003 | Hubert et al. |
| 7,381,696 B2 | 6/2008 | Hubert et al. |
| 8,298,436 B2 | 10/2012 | Michael |
| 8,431,036 B2 | 4/2013 | Mulligan et al. |
| 8,524,104 B1 | 9/2013 | Michael |
| 8,946,486 B2 | 2/2015 | Martin |

(Continued)

FOREIGN PATENT DOCUMENTS

| | | |
|---|---|---|
| WO | WO-2012/045080 A1 | 4/2012 |
| WO | WO 2013/055335 A1 | 4/2013 |

(Continued)

OTHER PUBLICATIONS

International Search Report for PCT/US2017/022776, dated Jun. 19, 2017.

(Continued)

*Primary Examiner* — Alexander R Pagano
(74) *Attorney, Agent, or Firm* — Foley & Lardner LLP

(57) ABSTRACT

Novel organosiloxane compounds are disclosed that are useful in firefighting foams. Methods of making and using the organosiloxane compounds and foams are also described.

24 Claims, No Drawings

(56) References Cited

U.S. PATENT DOCUMENTS

| | | | |
|---|---|---|---|
| 9,669,246 B2 | 6/2017 | Bowen et al. | |
| 9,950,978 B2 | 4/2018 | Martin | |
| 9,956,447 B2 | 5/2018 | Martin et al. | |
| 9,956,448 B2 | 5/2018 | Martin | |
| 10,046,191 B1 | 8/2018 | Hernandez et al. | |
| 10,173,089 B2 * | 1/2019 | Xie | C07C 303/30 |
| 2003/0001129 A1 | 1/2003 | Hubert et al. | |
| 2008/0128141 A1 | 6/2008 | Murata et al. | |
| 2009/0156073 A1 | 6/2009 | Schubert | |
| 2010/0002787 A1 | 1/2010 | Choi et al. | |
| 2010/0178512 A1 * | 7/2010 | Giesenberg | C09C 1/3081 428/405 |
| 2010/0278716 A1 | 11/2010 | Sudo et al. | |
| 2011/0240309 A1 | 10/2011 | Kingma et al. | |
| 2012/0251750 A1 * | 10/2012 | Sybert | C08L 69/00 428/35.7 |
| 2013/0055335 A1 | 2/2013 | Chien | |
| 2013/0092865 A1 | 4/2013 | Carlson et al. | |
| 2013/0277597 A1 | 10/2013 | Bowen et al. | |
| 2014/0127523 A1 | 5/2014 | Delis et al. | |
| 2014/0234629 A1 | 8/2014 | Sun et al. | |
| 2016/0023032 A1 | 1/2016 | Bowen | |
| 2016/0030790 A1 | 2/2016 | Libal et al. | |
| 2016/0038778 A1 | 2/2016 | Siem | |
| 2016/0038779 A1 | 2/2016 | Bowen et al. | |
| 2017/0182341 A1 | 6/2017 | Libal | |
| 2018/0345061 A1 | 12/2018 | Hernandez et al. | |

FOREIGN PATENT DOCUMENTS

| | | |
|---|---|---|
| WO | WO-2014/153122 | 9/2014 |
| WO | WO-2014/153140 A1 | 9/2014 |
| WO | WO-2017/161156 A1 | 9/2017 |
| WO | WO 2017/161162 A1 | 9/2017 |

OTHER PUBLICATIONS

BASF Corporation The Chemical Company, Tinopal NFW Liquid: Formulation Additives Technical Data Sheet, Aug. 2010, pp. 1-3.

* cited by examiner

ORGANOSILOXANE COMPOUNDS AS ACTIVE INGREDIENTS IN FLUORINE FREE FIRE SUPPRESSION FOAMS

CROSS REFERENCE TO RELATED APPLICATIONS

This application is a 371 national phase of PCT/US2017/022776, filed Mar. 16, 2017, which claims the benefit of the filing date of U.S. Provisional Patent Application No. 62/310,500, filed Mar. 18, 2016, the disclosures of which are incorporated, in their entirety, by this reference.

BACKGROUND

Technical Field

The invention described herein relates to novel organosiloxane compounds and methods of making and using the compounds. These compounds are useful in fire foam compositions as drop in additives or as a replacement for traditional fluorosurfactants.

Background Information

Conventional firefighting foams are prepared by aerating or trapping air within a concentrated foaming composition. These foams are typically prepared from concentrates by diluting with water and aerating the mixture to form a foam. The foams are then dispensed onto a fire forming a thick, foam blanket that suffocates and extinguishes a fire by reducing oxygen availability.

An important class of firefighting foams includes aqueous, film-forming foams (AFFFs). An important characteristic of these firefighting foams is stability over an extended period of time and burn back resistance. Conventional foams include fluorinated and perfluorinated surfactants such as perfluorooctanesulphonate (PFOS), perfluorooctanoic acid (PFOA) and fluorotelomer-based foams. These surfactants exhibit low surface tension, high foaming and spreading abilities, and demonstrate good burn back resistance due to the presence of fluoro groups. The negative environmental impact of foams including perfluorochemicals, however, has been recognized resulting in restricted use or a complete ban of foams containing perfluorochemicals in some countries.

The environmental impact of foams including perfluorochemicals results from the long half-life of these chemicals in the environment. Chemicals such as PFOS are resistant to hydrolysis, photolysis, microbial degradation, and vertebrate metabolism. For example, PFOS and PFOA have been shown to accumulate in water and reduce oxygen supply to aquatic life. These chemicals may also accumulate in the liver of mammals and result in acute toxicity.

The shorter chain, non-perfluorinated surfactants such as fluorotelomers present similar environmental problems because they contain perfluorinated chemical moieties. For example, $C_6$ fluorotelomers break down to perfluorohexanoic acid, which has been shown to also have negative environmental effects similar to the longer PFOA and PFOS perfluorochemicals. In addition, the manufacturing process of these shorter fluorotelomers results in the production of fluorotelomer alcohols that are significant sources of other environmentally damaging perfluorocarbons.

Thus, there is a recognized need for new fluorine-free firefighting foams which minimize impact to the environment while still presenting excellent foaming, stability and spreading ability in addition to burn back resistance.

Organosilicon based additives for use in firefighting foams have been contemplated, but the manufacturing of these silicon containing compounds is complex requires multiple steps and at an increased expense. These aspects have limited their use in firefighting foams. In addition, other silicon based compounds that have been contemplated for use in fire foams are bulky branched structures, which have limited effectiveness in lowering the surface tension of the foaming agents and promoting foam stability and spreading; see for example, U.S. Pat. No. 3,929,649.

BRIEF SUMMARY

In one embodiment, organosiloxane containing compounds of Formula I are disclosed:

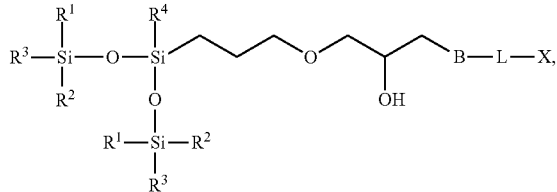

where $R^1$, $R^2$, $R^3$, and $R^4$ are each independently $C_nH_{2n+1}$, where n is an integer from 1 to 3; B is selected from —S—, —O—, and —N($R^5$)—, where $R^5$ is selected from H and $C_qH_{2q+1}$, where q is an integer from 1 to 3; L is selected from $C_1$-$C_6$ alkylene, $C_5$-$C_6$ cycloalkylene, and benzyl; and X is selected from —$CO_2$M, —$SO_3$M, and —$NH_4$T, where M is selected from a countercation and hydrogen and T is a counteranion.

In some embodiments, $R^1$, $R^2$, $R^3$, and $R^4$ are the same. In some embodiments, where $R^1$, $R^2$, $R^3$, and $R^4$ are different. In some embodiments, $R^1$, $R^2$, $R^3$, and $R^4$ are methyl. In some embodiments, n of Formula I is 1 or 2.

In some embodiments, the counteranion of Formula I is a halide selected from $Cl^-$, $Br^-$, and $I^-$. In some embodiments, the countercation of Formula I is selected from $Na^+$ and $K^+$.

In another embodiment, polyorganosiloxane containing compounds of Formula I are disclosed where $R^1$, $R^2$, $R^3$, and $R^4$ are methyl; M is $Na^+$; X is $SO_3$; L is a $C_2$ alkylene; and B is —N($R^5$)— and q is 1. In one embodiment, these compounds are of Structure S1:

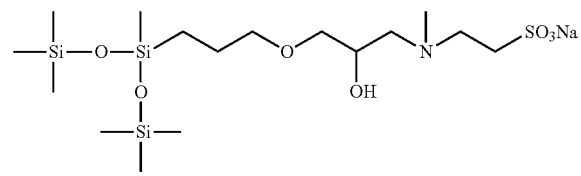

In another embodiment, polyorganosiloxane containing compounds of Formula I are disclosed where $R^1$, $R^2$, $R^3$, and $R^4$ are methyl; M is $Na^+$; X is $CO_2$; L is a $C_2$ alkylene; and B is S. In one embodiment, these compounds are of Structure S2:

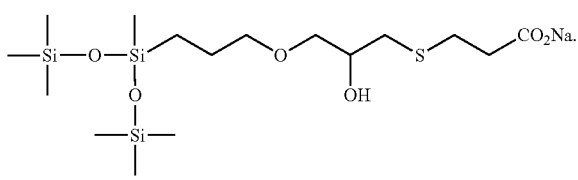

In another embodiment, polyorganosiloxane containing compounds of Formula I are disclosed where X is $SO_3$; M is $Na^+$; L is benzyl; and B is O. In one embodiment, these compounds are of Structure S3:

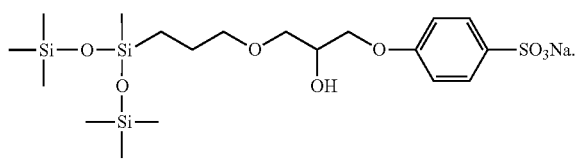

In some embodiments, the organosiloxane compound has a hydrophilic lipophilic balance of from about 2 to 20.

One aspect is a method of making the polyorganosiloxane compound of Formula I including: (a) providing a glycidyl ether terminated organosiloxane compound of Formula II:

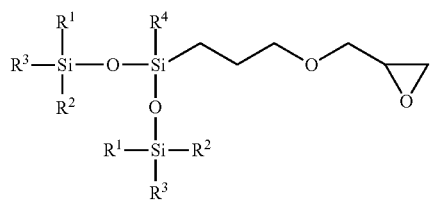

and (b) adding to a reaction mixture comprising the glycidyl ether terminated organosiloxane compound a reactant selected from $SH(CH_2)_mX$, $NH(C_q2_{q+1})(CH_2)_mX$ and

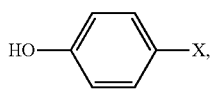

where X is as described for Formula I and m is an integer from 2 to 6. In some embodiments, the reactant is selected from $NH(CH_3)CH_2CH_2SO_3Na$, $SHCH_2CH_2CH_2CO_2Na$, $SHCH_2CH_2CO_2Na$, and

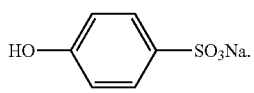

Another embodiment is a firefighting foam composition including an organosiloxane compound of Formula I. In some embodiments, the organosiloxane compound promotes a spreading and a stabilization of the firefighting foam. In some embodiments, the organosiloxane compound includes about 0.01% to about 25% of the foam composition.

In some embodiments, the firefighting foam further includes one or more surfactants, one or more solvents, one or more electrolytes, one or more foam stabilizers, one or more film formers, one or more corrosion inhibitors, or one or more antimicrobials or a combination thereof.

In some embodiments, the firefighting foam composition includes one or more surfactants including a non-ionic surfactant, a zwitterionic surfactant, or an anionic surfactant, or a combination thereof.

In some embodiments, the firefighting foam composition includes one or more surfactants including a non-ionic surfactant selected from polyoxyethylene derivatives of alkylphenols, linear or branched alcohols, fatty acids, alkylamines, alkylamides, and acetylenic glycols, alkyl glycosides and alkyl polyglycosides.

In some embodiments, the firefighting foam composition includes one or more surfactants including a zwitterionic surfactant selected from amine oxides, aminopropionates, sultaines, sulfobetaines, alkyl sulfobetaines, alkyl betaines, alkylamidobetaines, dihydroxyethyl glycinates, imadazoline acetates, imidazoline propionates, and imidazoline sulfonates.

In some embodiments, the firefighting foam composition includes one or more surfactants including an anionic surfactant selected from alkyl carboxylates and alkyl sulfates.

In some embodiments, the firefighting foam composition includes one or more solvents selected from hexylene glycol, butyl carbitol, butyl cellulose, polyethylene glycol, methyl diproxitol, propylene glycol, propylene glycol n-propyl ether, and tripropylene glycol methyl ether.

In some embodiments, the firefighting foam composition includes one or more stabilizers selected from ethylene glycol monoalkyl ethers, polyethylene glycol, diethylene glycol monoalkyl ethers, propylene glycol, dipropylene glycol monoalkyl ethers, triethylene glycol monoalkyl ethers, l-butoxyethoxy-2-propanol, glycerine, hexylene glycol, and trimethylglycine.

In some embodiments, the firefighting foam is selected from a low-expansion foam, a medium expansion foam, and a high-expansion foam.

Another embodiment is a method of extinguishing a fire including administering to a fire, a firefighting foam composition described herein. In some embodiments, the fire is a class A fire, a class B fire, a class C fire, or a class K fire.

DETAILED DESCRIPTION

The following paragraphs define in more detail the embodiments of the invention described herein. The following embodiments are not meant to limit the invention or narrow the scope thereof, as it will be readily apparent to one of ordinary skill in the art that suitable modifications and adaptations may be made without departing from the scope of the invention, embodiments, or specific aspects described herein. All patents and publications cited herein are incorporated by reference herein in their entirety.

For purposes of interpreting this specification, the following terms and definitions will apply and whenever appropriate, terms used in the singular will also include the plural and vice versa. In the event that any definition set forth below conflicts with any document incorporated herein by reference, the definition set forth below shall control.

The term "alkyl" as used herein alone or as part of another group, refers to a straight or branched chain hydrocarbon containing from 1 to 10, 20, or 30 or more carbon atoms unless otherwise specified. As used herein, the denotation $C_n$ $C_{n+m}$ refers to the number of carbons as a straight or branched alkyl chain, where n and m are integers greater than 1. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and the like. In some embodiments, alkyl may be straight chained. In some embodiments, alkyl may be branched.

The term "alkoxy" as used herein alone or as part of another group, refers to an alkyl group, as defined herein (and thus including substituted versions such as polyalkoxy), appended to the parent molecular moiety through an oxy group, —O—. Representative examples of alkoxy include, but are not limited to, methoxy, ethoxy, propoxy, 2-propoxy, butoxy, tert-butoxy, pentyloxy, hexyloxy and the like. In some aspects, alkoxy groups, when part of a more complex molecule, include an alkoxy substituent attached to an alkyl via an ether linkage.

The term "cyclic" or "cycloalkyl" as used herein alone or as part of another group, refers to a saturated or partially unsaturated cyclic hydrocarbon group containing from 3, 4 or 5 to 6, 7 or 8 carbons (which carbons may be replaced in a heterocyclic group as discussed below). Representative examples of cycloalkyl include cyclopropyl, cyclobutyl, cyclopentyl, cyclohexyl, cycloheptyl, and cyclooctyl. The term "cycloalkyl" is generic and intended to include heterocyclic groups as discussed below unless specified otherwise.

The term "aryl" or "aromatic" as used herein alone or as part of another group, refers to a monocyclic carbocyclic ring system or a bicyclic carbocyclic fused ring system having one or more aromatic rings. Representative examples of aryl include benzyl, azulenyl, indanyl, indenyl, naphthyl, phenyl, tetrahydronaphthyl, and the like. The term "aryl" or "aromatic" is intended to include both substituted and unsubstituted aryl or aromatic unless otherwise indicated.

The term "heterocyclic" as used herein alone or as part of another group, refers to an aliphatic (e.g., fully or partially saturated heterocyclic) or aromatic (e.g., heteroaryl) monocyclic- or bicyclic-ring system. Monocyclic ring systems are exemplified by any 3, 4, 5 or 6 membered ring containing 1, 2, 3, or 4 heteroatoms (i.e., other than a carbon atom) independently selected from oxygen, nitrogen and sulfur. The 5 membered ring has from 0-2 double bonds and the 6 membered ring has from 0-3 double bonds. The term "heterocyclic" as used herein, therefore, also encompasses heteroaromatic and heteroaryl groups.

The term "halo" or "halogen" as used herein refers to any suitable halogen, including —F, —Cl, —Br, and —I.

The term "amine" as used herein refers to a —N(R$^1$)(R$^2$) radical, where R$^1$ and R$^2$ may each independently be hydrogen or a suitable substituent, such as an alkyl group. The term primary amine refers to a —NH$_2$ radical; a secondary amine refers to a —NH(R$^1$) radical; and a tertiary amine refers to a —N(R$^1$)(R$^2$) radical where R$^1$ and R$^2$ are each independently alkyl.

As used herein, the term "HLB" refers to the hydrophilic-lipophilic balance of the compounds described herein. The HLB may be calculated by the equation below.

HLB=20*$M_h$/M where '$M_h$' is the molecular mass of the hydrophilic portion of the compound and 'M' is the molecular mass of the entire molecule. The scale ranges from 0 to 20, with a value of 0 corresponding to a complete lipophilic/hydrophobic molecule and a value of 20 corresponding to a completely hydrophilic/lipophobic molecule.

As used herein, the term "foam" or "firefighting foam" refers to a stable mass of low-density, air-filled bubbles. The density of these bubbles is lower than the solvent being coated with the foam, and thus, remains on top of the solvent to which the foam is being dispensed. As further described herein, the foams form a homogenous blanket for extinguishing a fire.

As used herein, the term "concentrate" or "foam concentrate" refers to a liquid concentrated solution, which when mixed with water at a specified ratio as described further herein forms a foam solution.

As used herein, the term "drainage" refers to the foam solution spreading over a liquid or fuel being coated. The drainage rate of a firefighting foam is the time it takes for the expanded foam mass to spread over the fuel or solvent on which the foam is dispensed.

As used herein, the term "expansion rate" or "expansion rate ratio" refers to the volume of expanded foam divided by the volume of foam concentrate used to create the expanded foam. For example, an expansion rate ratio of 5 to 1 indicates that for example, one litre of foam solution after aeration would fill an empty five-litre container with the expanded foam mass.

As used herein, the term "class A fire" refers to ordinary solid combustibles. Examples of combustible materials include paper and wood. As used herein, the term "class B fire" refers to flammable liquids and gases. Examples of such combustible materials include combustible liquids, petrol, grease, and oil. As used herein, the term "class C fire" refers to energized electrical equipment fires. As used herein, the term "class D fire" refers to combustible metal fires. As used herein, the term "class K fire" refers to kitchen fires. Examples of combustible kitchen fire fuels include cooking oils, grease, and animal fat.

Described herein are novel organosiloxane containing compounds. As further described herein, these compounds are well suited for drop in use in existing or new firefighting foam compositions. These organosiloxane containing compounds when used in firefighting foams demonstrate excellent foaming, spreading ability, and burn back resistance. Thus, as described herein, these organosiloxane-containing compounds may be used as a replacement for perfluorochemicals and perfluorosurfactants conventionally used in firefighting foams. These compounds are amphiphilic and demonstrate a low surface tension. Additional benefits of the silicon compounds described herein are (a) one step conversion reaction for synthesis, (b) a high conversion rate with a high yield requiring little to no purification steps, and (c) little to no halide content present in the final product.

In one embodiment, organosiloxane containing compounds of Formula I are disclosed:

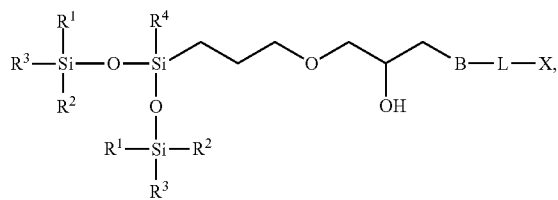

where R$^1$, R$^2$, R$^3$, and R$^4$ are each independently an alkyl group of C$_n$H$_{2n+1}$, where n is an integer from 1 to 3. B is selected from —S—, —O—, and —N(R$^5$)—, where R$^5$ is selected from H and C$_q$2$_{q+1}$, and q is an integer from 1 to 3. L is selected from C$_2$-C$_6$ alkylene, C$_5$-C$_6$ cycloalkylene, and benzyl; and X is selected from —CO$_2$M, —SO$_3$M, and —NH$_4$T, where M is a countercation and T is a counteranion. In some embodiments, M is a countercation selected from Na⁺ and K⁺. In some embodiments, T is a counteraction selected from Cl⁻, Br⁻, and I⁻.

In some embodiments, $R^1$, $R^2$, $R^3$, and $R^4$ of the organosiloxane containing compounds of Formula I are different. In some embodiments, $R^1$, $R^2$, $R^3$, and $R^4$ are the same. In some embodiments, $R^1$, $R^2$, $R^3$, and $R^4$ are methyl.

In some embodiments, B is —S—. In some embodiments, B is —O—. In some embodiments B is —N($R^5$)—, where $R^5$ is selected from H and $C_q2_{q+1}$, where q is an integer from 1 to 3. In some embodiments B is —N(CH₃)—.

In some embodiments, L is $C_2$-$C_6$ alkylene. In some embodiments, L is $C_2$ alkylene. In some embodiments, L is a $C_3$ alkylene. In some embodiments, L is $C_5$-$C_6$ cycloalkylene. In some embodiments, L is benzyl.

In some embodiments, X is —CO₂M. In some embodiments, X is —SO₃M. In some embodiments, M is Na⁺.

In some embodiments, the organosiloxane compounds have a HLB value of from about 0 to about 20. In some embodiments, the organosiloxane compounds have an HLB value of less than about 10. In some embodiments, the organosiloxane compounds have an HLB value of greater than about 10. In some embodiments, the organosiloxane compounds have an HLB value of between about 3 and about 6. In some embodiments, the organosiloxane compounds have an HLB value of between about 7 and about 9. In some embodiments, the organosiloxane compounds have an HLB value of between about 13 and about 15. In some embodiments, the organosiloxane compounds have an HLB value of between about 12 and about 16. In some embodiments, the silicon compounds have an HLB value of between about 15 and about 18.

Methods of Manufacturing Silicon Compounds

In one aspect, methods of making an organosiloxane containing compound of Formula I are disclosed. In some embodiments, the method includes (a) providing a glycidyl ether terminated organosilicon compound according to Formula II:

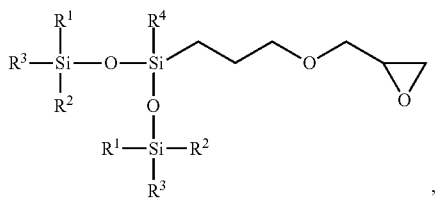

where $R^1$, $R^2$, $R^3$, and $R^4$ are as described for Formula I above; (b) adding to a reaction mixture including the glycidyl ether terminated organosilicon compound, a reactant selected from SH(CH₂)$_m$X, NH($C_q2_{q+1}$)(CH₂)$_m$X and

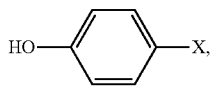

where m is an integer from 2 to 6; q is an integer from 1 to 3; X is selected from —CO₂M and —SO₃M; and M is selected from Na⁺ and K⁺. In some aspects, the method further includes isolating the synthesized organosiloxane compound.

In some embodiments, $R^1$, $R^2$, $R^3$, and $R^4$ of Formula II are the same or are different. In some embodiments, $R^1$, $R^2$, $R^3$, and $R^4$ are each methyl. In some aspects the glycidyl ether terminated, organosiloxane compound according to Formula II is (3-glycidoxypropyl)-bis-(trimethylsiloxy) methylsilane. In some embodiments, the reactant of (b) above is selected from NH(CH₃)CH₂CH₂SO₃Na, SHCH₂CH₂CH₂SO₃Na, SHCH₂CH₂CO₂Na, and

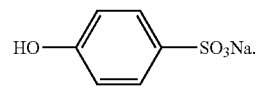

The organosilicon compounds of Formula II are available commercially and may be synthesized by synthetic methods known in the art. For example, (3-glycidoxypropyl)-bis-(trimethylsiloxy)methylsilane (CAS No. 7422-52-8) is commercially available from Gelest, Inc. Alternatively, the organosiloxane compounds of Formula II may be synthesized by organosiloxane methods known in the art, such as the direct process for generating chlorosilanes followed by reaction with a suitable Grignard reagent or an organolithium reagent, see, for example, West, R. Organosilicon Chemistry. *Journal of Chem. Ed.* 1980, 57, 165-169; Fleming, I. Organic Silicon Chemistry. In *Comprehensive Organic Chemistry*; Jones, N., Ed.; New York, 1979, Vol. 3 pp. 531-686; Voorhoeve, R. J. H. *Organohalosilanes: Precursors to Silicones*; New York, 1967; and Eaborn, C. Synthesis and Reactions of the Silicon-Carbon Bond. In *Organometallic Compounds of the Group IV Elements, The Bond to Carbon*; MacDiarmid, A., Ed.; New York, 1968, pp 105-536, each of which is incorporated by reference herein for the teachings of organosiloxane synthesis methods.

The method of making the organosiloxane containing compounds of Formula I may be carried out in any suitable reaction vessel known in the art such as, for example, a round bottom flask. The reaction may be carried out in an aqueous solution with a suitable evaporative solvent, such as a secondary alcohol (e.g., iso-propanol). The reaction may be carried out under conditions of heat with agitation. In some embodiments, the reaction conditions are carried out at a temperature of about 50° C. to about 75° C. for a period of time ranging from about 2 hours to about 48 hours. The final product may be isolated by a purification method known in the art. For example, the organosiloxane containing compounds of Formula I may be isolated by evaporating any remaining solvent.

Fire Foam Compositions

Some embodiments described are fire foam compositions including one or more of the organosiloxane containing compounds described herein. The fire foam composition may be any acqueous film forming foam (AFFF) or alcohol resistant film forming foam (AR-AFFF). These fire foams may be present as a concentrated composition. The concentrates may be produced at any suitable strength, including, but not limited to, 1, 3 and 6% (w/w) foam concentrates, which are concentrations that are typical for commercial use. Concentrates that are less than 1% (w/w) or greater than 6% (w/w) also may be prepared. The foam concentrates are mixed with water, which may include pure, deionized or distilled water, tap or fresh water, seawater, brine, or an aqueous or water-containing solution or mixture capable of serving as a water component for the firefighting foam composition.

Conventional AFFF concentrates contain mixtures of perfluoroalkyl and non-fluorinated hydrocarbon surfactants, each of which may be anionic, cationic, nonionic or amphoteric, solvents such as glycols and/or glycol ethers, and minor additives such as chelating agents, pH buffers, corrosion inhibitors and the like. Various conventional AFFF concentrates are described in, for example, U.S. Pat. Nos. 3,047,619; 3,257,407; 3,258,423; 3,562,156; 3,621,059; 3,655,555; 3,661,776; 3,677,347; 3,759,981; 3,772,199; 3,789,265; 3,828,085; 3,839,425; 3,849,315; 3,941,708; 3,95,075; 3,957,657; 3,957,658; 3,963,776; 4,038,198; 4,042,522; 4,049,556; 4,060,132; 4,060,489; 4,069,158; 4,090,976; 4,099,574; 4,149,599; 4,203,850; 4,209,407; and 8,431,036 each of which is incorporated by reference herein. AR-AFFF concentrates are described in, for example, U.S. Pat. Nos. 4,060,489; 4,149,599 and 4,387,032, each of which is incorporated by reference herein.

In contrast to the conventional fire foams mentioned above, the fire foam compositions described herein have little to no fluorine or fluorosurfactants. Thus, in some embodiments, the firefighting foam compositions have less than 5% by weight of fluorine. In some embodiments, the firefighting foam compositions have less than 1% by weight of fluorine. In some embodiments, the firefighting foam compositions have less than 0.5% by weight of fluorine. In some embodiments, the firefighting foam compositions are substantially free of fluorine. In some embodiments, the firefighting foam compositions are free of fluorine.

In some embodiments, the firefighting foam compositions have less than 5% by weight of fluorinated surfactants. In some embodiments, the firefighting foam compositions have less than 1% by weight of fluorinated surfactants. In some embodiments, the firefighting foam compositions have less than 0.5% by weight of fluorinated surfactants. In some embodiments, the firefighting foam compositions are substantially free of fluorinated surfactants. In some embodiments, the firefighting foam compositions are free of fluorinated surfactants.

In some embodiments, the firefighting foams as described herein have a composition as shown in Table 1.

TABLE 1

Exemplary firefighting foam composition

| Ingredient | Percent by weight |
| --- | --- |
| Organosiloxane compound of Formula I | 0.1-25 |
| Zwitterionic surfactant | 0-10 |
| Nonionic surfactant | 0-10 |
| Anionic surfactant | 0-10 |
| Foam stabilizer/foam aid | 0-15 |
| Water miscible solvent | 0-15 |
| Corrosion inhibitor | 0-5 |
| Film formers/thickeners | 0-10 |
| Antimicrobials/biocides | 0-0.05 |
| Electrolytes | 0-5 |
| Water | to 100% |

As described herein, the firefighting foam concentrates may be formulated at different concentrations, for example from 1% to 6%. As used herein, the lowest percent concentrate indicates the most concentrated foam composition. Thus, a 1% concentrate solution as a use strength pre-mix is formed after mixing 1 part of concentrate (e.g., a concentrate of Table 1) with 99 parts of water and a 6% use strength pre-mix solution is formed after mixing 6 parts of the concentrate (e.g., a concentrate of Table 1) with 94 parts of water. The water used in the firefighting foam compositions and for diluting a foam concentration to use strength may include pure, deionized or distilled water, tap or fresh water, sea water, brine, or an aqueous or water-containing solution or mixture capable of serving as a water component.

The concentration strength may be increased or decreased. For example, to prepare a 1% concentrate solution from a 3% concentrate solution, the weight amount of each agent in the firefighting foam composition concentrate would be increased by a factor of 3. Alternatively, to prepare a 3% concentrate solution from a 1% concentrate solution, the weight of each agent would be decreased by a factor of 3.

In some embodiments, the organosiloxane containing compounds are used in a firefighting foam composition. In some embodiments, the firefighting foam compositions are substantially free of fluorinated surfactants. In some embodiments, the firefighting foam compositions include an organosiloxane containing compound of Formula I.

In some embodiments, the firefighting foam compositions include from about 0.1% to about 25% by weight of a organosiloxane compound according to Formula I. In some embodiments, the firefighting foam compositions include from about 0.1% to about 20% by weight of a organosiloxane compound according to Formula I. In some embodiments, the firefighting foam compositions include from about 0.1% to about 15% by weight of a organosiloxane compound according to Formula I. In some embodiments, the firefighting foam compositions include from about 0.1% to about 10% by weight of a organosiloxane compound according to Formula I. In some embodiments, the firefighting foam compositions include from about 0.1% to about 5% by weight of a organosiloxane compound according to Formula I. In some embodiments, the firefighting foam compositions include from about 0.1% to about 3% by weight of a organosiloxane compound according to Formula I. In some embodiments, the firefighting foam compositions include from about 0.1% to about 1% by weight of a organosiloxane compound according to Formula I.

In some embodiments, the firefighting foam compositions include additional organosiloxane compounds including one or more siloxy polymers of Formulas III or IV.

In some embodiments, the firefighting foam compositions include an additional organosiloxane polymer of Formula III:

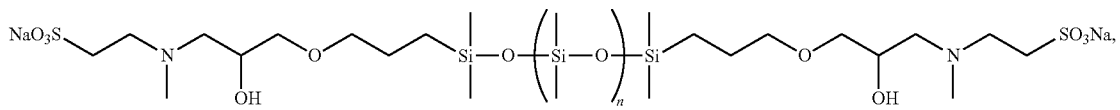

where n is an integer from 1 to 20.

In some embodiments, the firefighting foam compositions include an additional organosiloxane containing compound of Formula IV:

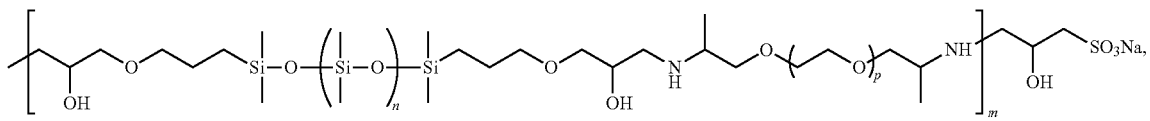

where n is an integer from 1 to 20, p is an integer from 2 to 40, and m is an integer from 1 to 1,000,000.

In some embodiments, the fire foam compositions contain additional hydrocarbon surfactants. These surfactants promote foam formation of following aeration. The use of additional surfactants also functions to promote foam spreading, drainage, fluidity, and expansion. In addition, the use of surfactants may aid in the solubilization of other components in hard water, sea water or brine solutions. The additional hydrocarbon surfactant may be anionic, zwitterionic/amphoteric, or cationic having a linear carbon chain of about 6 to 20 carbon atoms. In the present context, a reference to surfactants of different charge types refers to, for example, anionic and non-ionic surfactants, or anionic and zwitterionic surfactants.

Exemplary and non-limiting zwitterionic or amphoteric hydrocarbon surfactants include, but are not limited to, those which contain in the same molecule, amino and carboxy, sulfonic, and sulfuric ester moieties, such as amine oxides, aminopropionates, sultaines, sulfobetaines, alkyl sulfobetaines, alkyl betaines, alkylamidobetaines, dihydroxyethyl glycinates, imadazoline acetates, imidazoline propionates, and imidazoline sulfonates. Commercially available products include Chembetaine CAS (Lubrizol Inc.), Mirataine™ H2C-HA (sodium laurimino dipropionate), Miranol™ C2M-SF Conc. (sodium cocoampho propionate), Mirataine™ CB (cocamidopropyl betaine), Mirataine™ CBS (cocamidopropyl hydroxysultaine), and Miranol™ JS Conc. (sodium caprylampho hydroxypropyl sultaine), all commercially available from Rhone-Poulenc Corp.; imidazole-based surfactants are described in U.S. Pat. No. 3,957,657, which is incorporated by reference herein for its teachings thereof. In some aspects, the zwitterionic surfactant includes an alkyl sulfobetaine.

Exemplary and non-limiting anionic hydrocarbon surfactants include, but are not limited to, $C_8$-$C_{16}$ alkyl surfactants, alkyl carboxylates, alkyl sulfates, sulfonates, and their ethoxylated derivatives. Examples of alkyl sulfates include but are not limited to sodium octyl sulfate (e.g., Sipex™ OLS, commercially available from Rhone-Poulenc Corp., Cranberry, N.J.) and sodium decyl sulfate (e.g., Polystep™ B-25, commercially available from Stepan Co., Northfield, Ill.); alkyl ether sulfates such as $C_nH_{2n+1}(OC_2H_4)_2OSO_3Na$, where $6 \leq n \leq 12$ (e.g., Witcolate™ 7093, commercially available from Witco Corp., Chicago, Ill.); and alkyl sulfonates such as $C_nH_{2n+1}SO_3Na$, where $6 \leq n \leq 12$. In additional alkali metal and ammonium salts are suitable. In some aspects, the one or more anionic hydrocarbon surfactants includes decyl sulfate.

Suitable nonionic surfactants include, but are not limited to, polyoxyethylene derivatives of alkylphenols, linear or branched alcohols, fatty acids, alkylamines, alkylamides, and acetylenic glycols, alkyl glycosides and alkyl polyglycosides available as, for example, APG 325N (DeWolf Chemical), block polymers of polyoxyethylene and polyoxypropylene units. Additional nonionic surfactants are described in U.S. Pat. No. 5,207,932, which is incorporated by reference herein. In some aspects, the nonionic surfactant is an alkyl polyglycoside (e.g., APG 325N).

In some embodiments, the firefighting foams include one or more water-soluble polymeric film formers or thickeners. In some embodiments, these film formers or thickeners are suitable for AR-AFFF concentrates for extinguishing fires involving polar solvents or fuels. These film formers precipitate from solution when the foam bubbles come into contact with the polar solvents and fuel and form a vapor-repelling polymer film at the solvent/foam interface, preventing foam collapse. Examples of suitable compounds include thixotropic polysaccharide gums as described in U.S. Pat. Nos. 3,957,657; 4,060,132; 4,060,489; 4,306,979; 4,387,032; 4,420,434; 4,424,133; 4,464,267, 5,218,021, and 5,750,043, 6,262,128, and 7,868,167 each of which are incorporated by reference herein.

Exemplary and non-limiting commercially available film forming compounds are marketed as Rhodopol, Keltrol, Kelco, Actigum, Cecal-gum, Galaxy, and Kelzan. Additional exemplary gums and resins useful as film formers include acidic gums such as xanthan gum, diutan gum, pectic acid, alginic acid, agar, carrageenan gum, rhamsam gum, welan gum, mannan gum, locust bean gum, galactomannan gum, pectin, starch, bacterial alginic acid, succinoglucan, gum arabic, carboxymethylcellulose, heparin, phosphoric acid polysaccharide gums, dextran sulfate, dermantan sulfate, fucan sulfate, gum karaya, gum tragacanth and sulfated locust bean gum. Exemplary and non-limiting neutral polysaccharides useful as film formers include: cellulose, hydroxyethyl cellulose, dextran and modified dextrans, neutral glucans, hydroxypropyl cellulose, as well, as other cellulose ethers and esters. Modified starches include starch esters, ethers, oxidized starches, and enzymatically digested starches. In some embodiments, the one or more film forming compounds includes diutan gum.

Foam aids may be used to enhance foam expansion and drain properties, while providing solubilization and antifreeze action. Exemplary and non-limiting foam aids include alcohols or ethers such as ethylene glycol monoalkyl ethers, polyethylene glycol, diethylene glycol monoalkyl ethers, propylene glycol, dipropylene glycol monoalkyl ethers, triethylene glycol monoalkyl ethers, 1-butoxyethoxy-2-propanol, glycerine, hexylene glycol, and trimethylglycine. Useful foam aids are known, see, for example, in U.S. Pat. Nos. 5,616,273, 3,457,172; 3,422,011 and 3,579,446, and in PCT International Application Pub. No. WO 2014/153140 each of which is incorporated by reference herein. In some embodiments, the one or more foam aids includes propylene glycol.

In some embodiments, the firefighting foams include one or more chelators or sequestering buffer. Exemplary and non-limiting chelators and sequestering buffers include agents that sequester and chelate metal ions, including polyaminopolycarboxylic acids, ethylenediaminetetraacetic acid, citric acid, tartaric acid, nitrilotriacetic acid, hydroxyethylethylenediaminetriacetic acid and salts thereof. Exemplary buffers include Sorensen's phosphate or McIlvaine's citrate buffers.

In some embodiments, the firefighting foams include one or more corrosion inhibitors. Exemplary and non-limiting corrosion inhibitor includes ortho-phenylphenol, tolyltriazole, and phosphate ester acids. In some embodiments, the corrosion inhibitor is tolyltriazole.

In some embodiments, the firefighting foams include one or more electrolytes. An electrolyte present in small quantities may balance the performance of fire foam agents when mixed with water ranging from soft to very hard, including sea water or brine, and to improve agent performance in very soft water. Typical electrolytes include salts of monovalent or polyvalent metals of Groups 1, 2, or 3, or organic bases. Exemplary and non-limiting alkali metals useful in the fire foam compositions described herein are sodium, potassium, or magnesium. Exemplary and non-limiting organic bases include ammonium, trialkylammonium, bis-ammonium salts and the like. Additional electrolytes include, but are not limited to sulfates, bisulfates, phosphates, nitrates and polyvalent salts including magnesium sulfate and magnesium nitrate. In some embodiments, the electrolyte is magnesium sulfate.

In some embodiments, the firefighting foam includes one or more antimicrobial, biocidal, or preservatives. These components are included to prevent the biological decomposition of natural product based polymers that are incorporated as polymeric film formers (e.g., a polysaccharide gum). Examples include Kathon CG/ICP (Rohm & Haas Company), Givgard G-4 40 (Givaudan, Inc.), and Dowicil 75 (Dow Chemical Company). Additional preservatives are disclosed in U.S. Pat. Nos. 3,957,657; 4,060,132; 4,060,489; 4,306,979; 4,387,032; 4,420,434; 4,424,133; 4,464,267, 5,207,932, 5,218,021, and 5,750,043, each of which is incorporated by reference herein. In some aspects, the biocidal agent is Dowicil 75.

In some embodiments, the firefighting foam includes one or more water miscible non-aqueous solvents. Exemplary and non-limiting solvents include hexylene glycol, butyl carbitol, butyl cellosolve, polyethylene glycol, methyl diproxitol, propylene glycol, propylene glycol n-propyl ether, and tripropylene glycol methyl ether. In some embodiments, the one or more non-aqueous solvents is propylene glycol. In some embodiments, the one or more non-aqueous solvents is butyl carbitol. In some aspects, the one or more non-aqueous solvents is butyl carbitol and propylene glycol.

Methods of Using Firefighting Foams

Some embodiments described herein are methods of using the firefighting foam compositions described herein to extinguish a fire. The firefighting foam compositions described herein are introduced into a fire or flame in an amount sufficient to extinguish the fire or flame. One skilled in the art will recognize that the amount of extinguishing composition needed to extinguish a particular hazard will depend upon the nature and extent of the hazard. In some aspects, the firefighting foams described herein are used to extinguish a class A fire. In some aspects, the firefighting foams described herein are used to extinguish a class B fire. In some aspects, the firefighting foams described herein are used to extinguish a class C fire. In some aspects, the firefighting foams described herein are used to extinguish a class D fire. In some aspects, the firefighting foams described herein are used to extinguish a class K fire. The fire foam agents and percent weight of the fire foam compositions described herein may be modified to suit the class of fire being extinguished as would be understood by a person of skill in the art.

In some embodiments, the foam composition can be applied to a variety of substrates, including liquid non-polar (e.g., petrol) and polar liquid chemicals. The applied foam spreads quickly as a thick yet mobile blanket over a surface of a liquid chemical, for rapid coverage and/or extinguishment of a fire. In the case of a burning liquid chemical, drainage from the foam composition (i.e., the aqueous phase) drains and spreads as a film over the surface of the liquid chemical. If the film becomes disturbed or broken, it has properties to reform to seal vapors (sometimes existing at elevated temperatures) and prevent ignition or re-ignition of the liquid chemical. The foam compositions described herein remain in the form of a foam blanket over the liquid chemical to provide continued vapor suppression and resistance to ignition or re-ignition (i.e., burnback resistance) of the liquid chemical for a significant time after extinguishment.

In some embodiments, the firefighting foam concentrates are mixed with water to form a use strength formulation. In some embodiments, the firefighting foams are mixed as a 3% solution, and foamed using foaming devices well known in the art. As water under pressure passes through a fire hose, typically 3 percent by volume of the concentrate composition is inducted into the hose line by the Venturi effect to form a foam solution of the concentrate diluted with water. The solution becomes aerated to produce a finished foam by use of an air-aspirating nozzle located at the outlet end of the hose. A foam solution stored for any length of time prior to aeration is known as a foam premix and can likewise be aerated to produce a finished foam. Equipment which can be used to produce and apply these aqueous air-foams are known in the art and also are described in publications by the National Fire Protection Association.

In some embodiments, the foaming composition, containing the foam agents as described herein exists as a transitory composition as a flow of water within a fire-fighting foam dispenser (e.g., a fire hose). Therefore, after formation of the foaming composition, the foaming composition can be aerated by methods that are well understood in the art of foam compositions, e.g., using an air-aspirating nozzle, to form a foam composition including a vapor phase (e.g., air) entrained in a liquid phase (e.g., aqueous). The amount of air generally included in the foam can be such that the air will be the major component of the foam by volume, e.g., greater than about 50 percent by volume, for example from about 75 to 98 percent by volume air. In some embodiments, the foam for most applications has a density of less than 1 gram per cubic centimeter with a defined expansion rate ratio (volume of expanded foam in relation to the weight of unexpanded foam in grams).

In some embodiments, the firefighting foam has an expansion ratio from about 2 to 1 to about 1000 to 1. In some embodiments, the firefighting foam is a low expansion foam having an expansion ratio of about 2 to 1 to about 20 to 1. In some embodiments, the firefighting foam is a medium expansion foam having an expansion ratio of about 20 to 1 to about 200 to 1. In some embodiments, the firefighting foam is a high expansion foam having an expansion ratio of about 200 to 1 to about 1000 to 1.

EXAMPLES

Example 1. Synthesis of a Silicon Compound According to Structure S1

The organosiloxane compound of structure S1 was synthesized according to reaction 1. To a 250 ml round bottom flask was added (3-glycidoxypropyl)-bis-(trimethylsiloxy) methylsilane, sodium 2-(methylamino)ethane-1-sulfonate, IPA, and water, where the IPA and water were added in a 2 to 1 ratio. The reaction mixture stirred at 60-65° C. for one day in a closed system followed by the evaporation to remove iso-propanol to give ~98 (wt) % concentrate as final desired product.

Reaction 1:

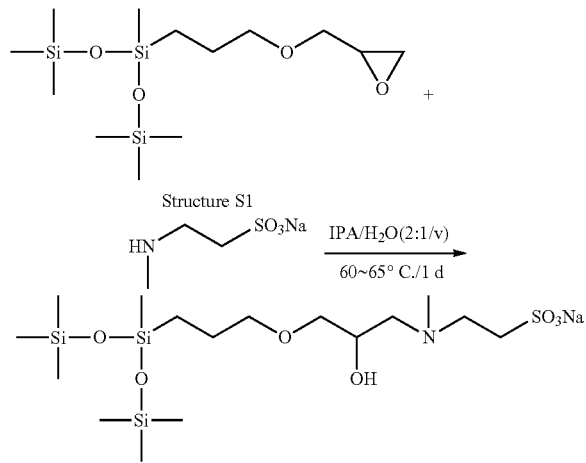

Example 2. Synthesis of a Silicon Compound According to Structure S2

The organosiloxane compound of structure S2 was synthesized according to reaction 2. To a 250 ml round bottom flask was added 8.60 g (0.025 mol) of (3-glycidoxypropyl)-bis-(trimethylsiloxy)methylsilane, 5.15 g (0.026 mol) of sodium 3-mercapto-1-propanesulfonate (90% purity), 60 ml of IPA, and 20 ml of water. 0.02 g of NaOH was added to the above mixture to adjust its pH to 7~8. The mixture was refluxed for 2 days in a closed system followed by the removal of all volatile materials to its constant weight. 12.38 g of white solid was obtained as a final product with a material balance at 96.34 (wt) %.

Reaction 2:

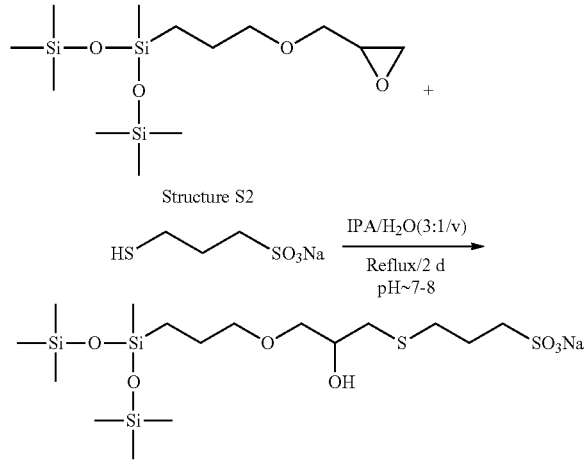

Example 3. Synthesis of a Silicon Compound According to Structure S3

The organosiloxane compound of structure S3 was synthesized according to reaction 3. To a 250 ml round bottom flask was added (3-glycidoxypropyl)-bis-(trimethylsiloxy)methylsilane, sodium 3-mercaptopropionate, IPA and water, where the IPA and water were added in a 3 to 1 ratio. The mixture was then adjusted to a pH of 7~8. The mixture was refluxed in a closed system for two days followed by the removal of all volatile materials to its constant weight.

Reaction 3:

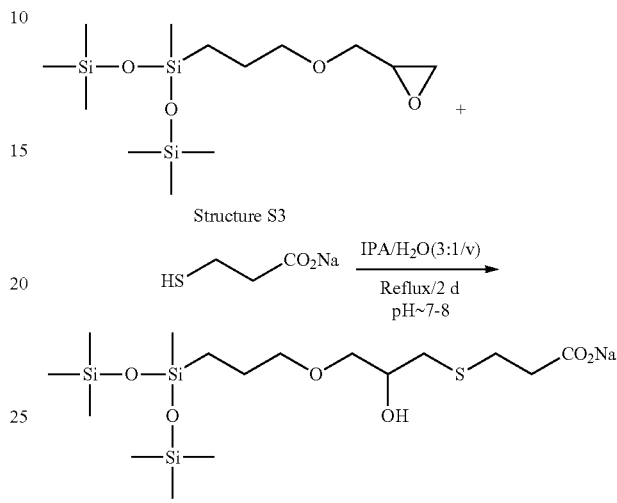

Example 4. Synthesis of a Silicon Compound According to Structure S4

The organosiloxane compound of structure S4 was synthesized according to reaction 4. To a 250 ml of round bottom flask was added (3-glycidoxypropyl)-bis-(trimethylsiloxy)methylsilane, sodium 4-hydroxylbenzenesulfonate, IPA, and water, where the IPA and water were added in a 3 to 1 ratio. The mixture was then adjusted to a pH of 7~8. The mixture was refluxed in a closed system for two days followed by the removal of all volatile materials to its constant weight.

Reaction 4:

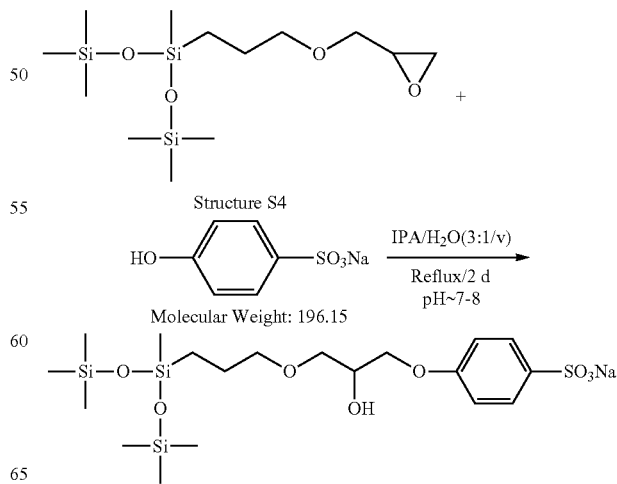

Example 5. Synthesis of a Polyorganosiloxane of Formula III

A polyorganosiloxane of Formula III was synthesized according to reaction 5. To a 250 ml of round bottom flask was added 9 g (0.01 mol) poly(dimethylsiloxane), diglycidyl ether terminated (CAS #130167-23-6) (Mw~900), 60 ml of iso-propanol, 28 ml of water and 5.47 g (0.0204 mol) of 60% n-methyltaurine (CAS #107-68-6) aqueous solution. The reaction mixture was stirred at 60~65° C. for one day followed by the evaporation of iso-propanol to ~50 (wt) % of a concentrate as final desired product.

Reaction 1:

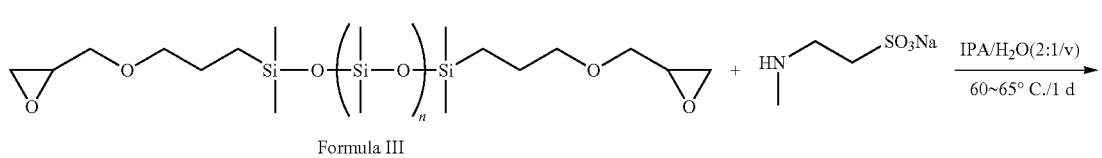

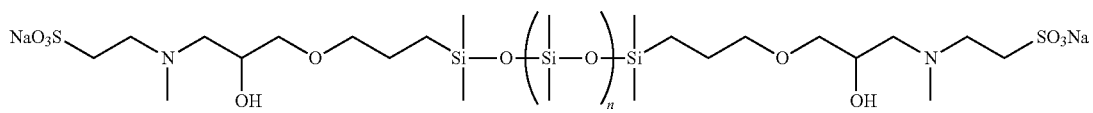

Formula III where n is an integer from 1 to 20.

Example 6. Synthesis of a Polyorganosiloxane of Formula IV

A polyorganosiloxane of Formula IV was synthesized according to reaction 6. To a 500 ml of round bottom flask was added 24.8 g (0.045 mol) of poly(dimethylsiloxane), diglycidylether terminated (CAS #130167-23-6), (Mw~500~600), 180 ml of iso-propanol and 33.6 g (0.06 mol) of Jeffamine-600 (CAS #65605-38-9) (Mw-650). The reaction mixture was stirred at 6065° C. for one day in a system. An aqueous solution of 12.4 g (0.06 mol) of 3-chloro-2-hydroxy-propane acid (CAS #143218-48-8), sodium salt in 90 ml of water was added to the above mixture. The reaction mixture stirred at 70° C. for one day in a closed system followed by the evaporation to remove iso-propanol to give ~52 (wt) % concentrate as final desired product.

Reaction 6:

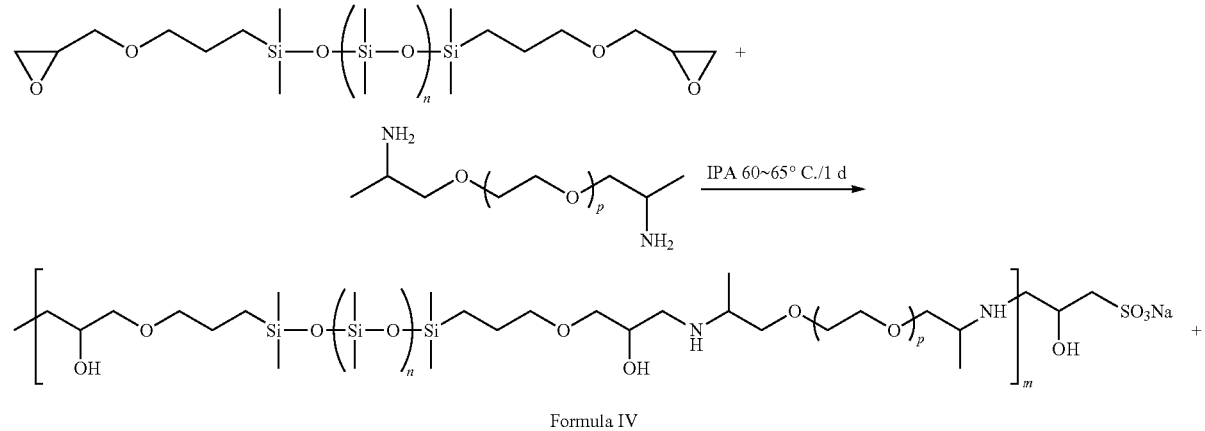

Formula IV

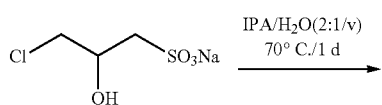

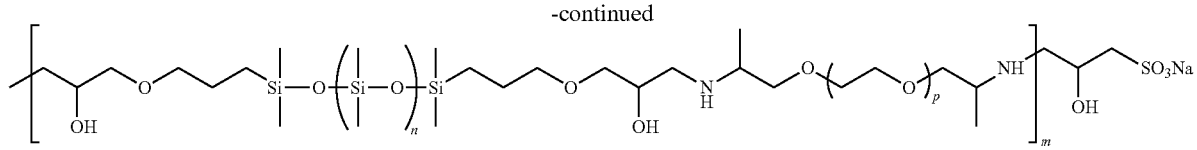

where n is an integer from 1 to 20, p is an integer from 2 to 40, and m is an integer from 1 to 1,000,000.

Example 7. Fire Testing of a Fire Foam Including Organosiloxane Compounds as Active Ingredients A 3% concentrate test fire foam according to Table 2 was generated. This foam was then subsequently evaluated to determine the fire extinguishing performance of a mixture of organosiloxane compounds and polyorganosiloxanes described herein. A total of 2,500 grams of a 3% premix was made using tap water. The premix was stirred with an overhead mixer for 5 minutes yielding a mixture that was mostly clear to slightly hazy with no obvious solids present.

TABLE 2

Exemplary Organosiloxane firefighting foam composition

| Foam Agent Class | Foam Agent | Grams | | |
|---|---|---|---|---|
| Non-fluorinated compound 1 | Organosiloxane of Structure S1 | 3.63 (55% pure) | 1.01 | |
| Non-fluorinated compound 2 | Polyorganosiloxane of Formula III | 2.87 (62.6% pure) | 0.91 | |
| Non-fluorinated compound 3 | Polyorganosiloxane of Formula IV | 1.84 (>98% pure) | 0.91 | |
| Nonionic surfactant | APG 325N | 10 | 5.07 | |
| Zwitterionic surfactant | Alkyl-sulfobetaine | 5 | 2.53 | |
| Anionic surfactant | Decyl sulfate | 22 | 11.15 | |
| Electrolytes | $MgSO_4$ | 3 | 1.52 | |
| Corrosion inhibitor | Tolyltriazole | 0.08 | 0.04 | |
| Antimicrobials/biocides | Dowicil 75 | 0.06 | 0.03 | |
| Water miscible solvent | Butyl carbitol | 15 | 7.60 | |
| Foam stabilizer/foam aid | Propylene glycol | 8 | 4.06 | |
| Film formers/thickeners | Diutan | 0.92 | 0.47 | |
| Water | Tap water | 127.6 | 64.69 | |
| Total | | 200 | 100 | |

The foam according to Table 2 was then used in burn tests to extinguish hydrophobic (heptane) and hydrophilic (acetone) based solvent fires. The equipment used for dispensing and fire testing of the foam was a pan containing the specified ignitable fuel, a nozzle, turntable, air gauge, and stop watch.

The foam was first dispensed on a mixture of 500 ml of heptane and 500 ml of water in a pan at a pressure of 25 psi (0.1896 gpm). The foam was applied for 24 seconds and the pan was covered by the foam in 13 seconds with extinguishment in 24 seconds. The foam demonstrated burnback resistance for 10:29 (mm:ss) with ~8% of the foam blanket open at 09:40.

Next, the foam was dispensed on a mixture of 1000 ml of acetone in a pan at a pressure of 25 psi (0.1896 gpm). The foam was applied for 90 seconds and the pan was covered by the foam in 20 seconds with extinguishment in 31 seconds. The foam demonstrated burnback resistance for 20:40 (mm:ss) with ~50% of the foam blanket open at 19:40.

It is further contemplated that the firefighting foams described herein exhibit burn back resistance and fire extinguishment when formulated with a single organosiloxane compound according to Formula I.

Although the invention herein has been described in connection with described embodiments thereof, it will be appreciated by those skilled in the art that additions, modifications, substitutions, and deletions not specifically described may be made without departing from the spirit and scope of the invention as defined in the appended claims. It is therefore intended that the foregoing detailed description be regarded as illustrative rather than limiting, and that it be understood that it is the following claims, including all equivalents, that are intended to define the spirit and scope of this invention.

STATEMENTS

1. An organosiloxane compound of Formula I:

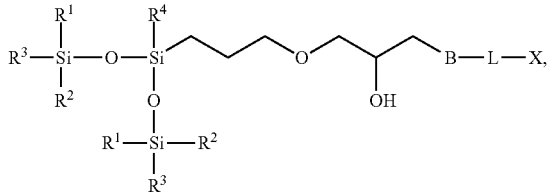

wherein $R^1$, $R^2$, $R^3$, and $R^4$ are each independently $C_nH_{2n+1}$, where n is an integer from 1 to 3;

B is selected from —S—, —O—, and —N($R^5$)—, where $R^5$ is selected from H and $C_qH_{2q+1}$, wherein q is an integer from 1 to 3;

L is selected from $C_1$-$C_6$ alkylene, $C_5$-$C_6$ cycloalkylene, and benzyl; and X is selected from —$CO_2$M, —$SO_3$M, and —$NH_4$T, wherein M is selected from a countercation and hydrogen and T is a counteranion.

2. The organosiloxane compound of statement 1, wherein $R^1$, $R^2$, $R^3$, and $R^4$ are the same.

3. The organosiloxane compound according to statement 1, wherein $R^1$, $R^2$, $R^3$, and $R^4$ are different.

4. The organosiloxane compound according to any one of statements 1-3, wherein n is 1 or 2.

5. The organosiloxane compound according to any one of statements 1-2, wherein $R^1$, $R^2$, $R^3$, and $R^4$ are methyl.

6. The polyorganosiloxane compound according to according to any one of statements 1-5, wherein the counteranion is a halide selected from $Cl^-$, $Br^-$, and $I^-$.

7. The polyorganosiloxane compound according to according to any one of statements 1-5, wherein the counteranion is selected from $Na^+$ and $K^+$.

8. The organosiloxane compound of statement 1, wherein $R^1$, $R^2$, $R^3$, and $R^4$ are methyl; M is $Na^+$; X is SO3; L is a $C_2$ alkylene; and B is —N($R^5$)— and q is 1, according to the structure S1:

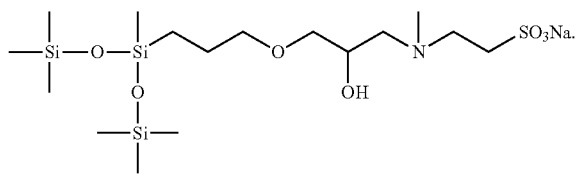

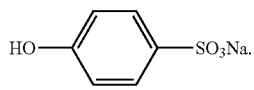

9. The organosiloxane compound of statement 1, wherein $R^1$, $R^2$, $R^3$, and $R^4$ are methyl; M is $Na^+$; X is $CO_2$; L is a $C_2$ alkylene; and B is S, according to the structure S2:

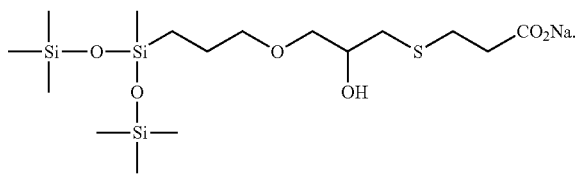

10. The organosiloxane compound of statement 1, wherein X is $SO_3^-$; M is $Na^+$; L is benzyl; and B is O, according to the structure S3:

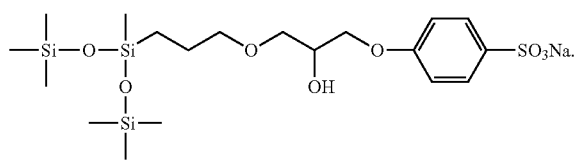

11. The organosiloxane compound according to any one of statements 1-10, wherein the organosiloxane compound has a hydrophilic lipophilic balance of from about 2 to 20.

12. A method of making the organosiloxane compound according to any one of statements 1-11, comprising:
(a) providing a glycidyl ether terminated organosiloxane compound of Formula II:

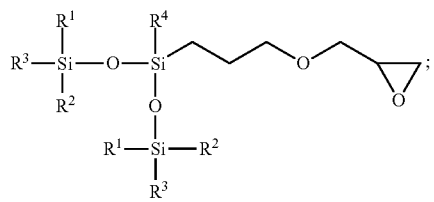

and
(b) adding to a reaction mixture comprising the glycidyl ether terminated organosiloxane compound a reactant selected from $SH(CH_2)_mX$, $NH(C_q2_{q+1})(CH_2)_mX$ and

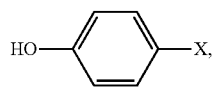

wherein m is an integer from 2 to 6.

13. The method of statement 12, wherein the reactant is selected from $NH(CH_3)CH_2CH_2SO_3Na$, $SHCH_2CH_2CH_2CO_2Na$, $SHCH_2CH_2CO_2Na$, and 14. A firefighting foam composition comprising an organosiloxane compound according to any one of statements 1-13.

15. The firefighting foam composition of statement 14, wherein the organosiloxane compound promotes a spreading and a stabilization of the firefighting foam.

16. The firefighting foam according to any one of statements 14-15, further comprising one or more surfactants, one or more solvents, one or more electrolytes, one or more foam stabilizers, one or more film formers, one or more corrosion inhibitors, or one or more antimicrobials.

17. The firefighting foam composition according to any one of statements 14-16, wherein the organosiloxane compound comprises about 0.01% to about 25% of the foam composition.

18. The firefighting foam composition according to any one of statements 16-17, wherein the one or more surfactants comprises a non-ionic surfactant, a zwitterionic surfactant, or an anionic surfactant, or a combination thereof.

19. The firefighting foam composition according to any one of statements 16-18, wherein the one or more surfactants comprises a non-ionic surfactant selected from polyoxyethylene derivatives of alkylphenols, linear or branched alcohols, fatty acids, alkylamines, alkylamides, and acetylenic glycols, alkyl glycosides and alkyl polyglycosides.

20. The firefighting foam composition according to any one of statements 16-18, wherein the one or more surfactants comprises a zwitterionic surfactant selected from amine oxides, aminopropionates, sultaines, sulfobetaines, alkyl sulfobetaines, alkyl betaines, alkylamidobetaines, dihydroxyethyl glycinates, imadazoline acetates, imidazoline propionates, and imidazoline sulfonates.

21. The firefighting foam composition according to any one of statements 16-18, wherein the one or more surfactants comprises an anionic surfactant selected from alkyl carboxylates and alkyl sulfates.

22. The firefighting foam composition according to any one of statements 16-21, wherein the one or more solvents is selected from hexylene glycol, butyl carbitol, butyl cellulose, polyethylene glycol, methyl diproxitol, propylene glycol, propylene glycol n-propyl ether, and tripropylene glycol methyl ether.

23. The firefighting foam composition according to any one of statements 16-22, wherein the one or more stabilizers is selected from ethylene glycol monoalkyl ethers, polyethylene glycol, diethylene glycol monoalkyl ethers, propylene glycol, dipropylene glycol monoalkyl ethers, triethylene glycol monoalkyl ethers, 1-butoxyethoxy-2-propanol, glycerine, hexylene glycol, and trimethylglycine.

24. The firefighting foam composition according to any one of statements 14-23, wherein the foam is selected from a low-expansion foam, a medium expansion foam, and a high-expansion foam.

25. A method of extinguishing a fire comprising administering to a fire, the firefighting foam composition according to any one of statements 14-24.

26. The method of statement 25, wherein the fire is a class A fire, a class B, a class C fire, or a class K fire.

The invention claimed is:
1. An organosiloxane compound of Formula:

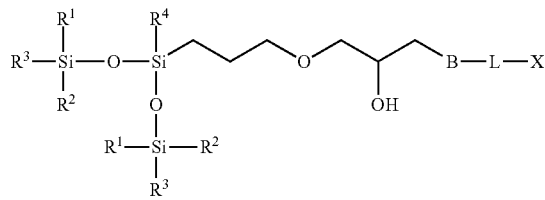

wherein $R^1$, $R^2$, $R^3$, and $R^4$ are each independently $C_nH_{2n+1}$, where n is an integer from 1 to 3;
B is selected from —S— and —O—;
L is selected from $C_1$-$C_6$ alkylene, $C_5$-$C_6$ cycloalkylene, phenylene and benzyl; and
X is selected from —$CO_2M$, —$SO_3M$, and $NH_3T$, wherein M is selected from a countercation and hydrogen; and T is a counteranion.

2. The organosiloxane compound according to claim 1, wherein n is 1 or 2.

3. The organosiloxane compound according to claim 1, wherein $R^1$, $R^2$, $R^3$, and $R^4$ are methyl.

4. The organosiloxane compound of claim 1, wherein $R^1$, $R^2$, $R^3$, and $R^4$ are methyl; M is $Na^+$; X is $CO_2M$; L is a $C_2$ alkylene; and B is —S—, according to the structure:

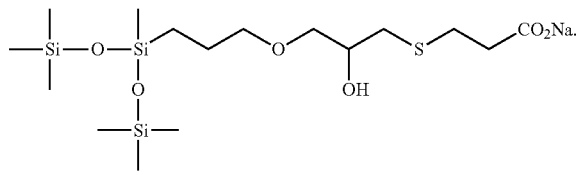

5. The organosiloxane compound of claim 1, wherein X is $SO_3M$; M is $Na^+$; L is phenylene; and B is —O—, according to the structure:

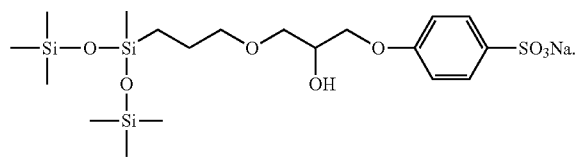

6. A method of making the organosiloxane compound according to claim 1, comprising:
(a) providing a glycidyl ether terminated organosiloxane compound of Formula II:

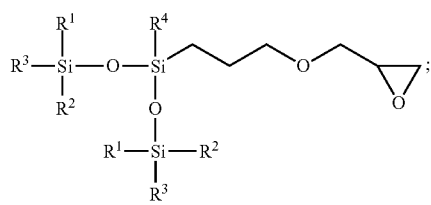

and
(b) adding to a reaction mixture comprising the glycidyl ether terminated organosiloxane compound a reactant selected from $HS(CH_2)_mX$ and

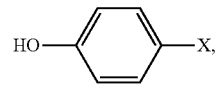

wherein m is an integer from 2 to 6 and X is —$CO_2M$ or —$SO_3M$, wherein M is a countercation and/or hydrogen.

7. A firefighting foam composition comprising a non-ionic surfactant, a zwitterionic surfactant, an anionic surfactant, or a combination of two or more thereof; and an organosiloxane compound according to claim 1.

8. The firefighting foam composition according to claim 7, further comprising one or more solvents, one or more electrolytes, one or more foam stabilizers, one or more film formers, one or more corrosion inhibitors, one or more antimicrobials or a combination thereof.

9. The firefighting foam composition according to claim 7, wherein the foam composition comprises about 0.01% to about 25% of the organosiloxane compound.

10. The firefighting foam composition according to claim 7, wherein comprising one or more zwitterionic surfactants selected from amine oxides, aminopropionates, sultaines, sulfobetaines, alkyl sulfobetaines, alkyl betaines, alkylamidobetaines, dihydroxyethyl glycinates, imadazoline acetates, imidazoline propionates, and imidazoline sulfonates.

11. The organosiloxane compound of claim 1, wherein $R^1$, $R^2$, $R^3$, and $R^4$ are methyl; X is $CO_2M$ or $SO_3M$; L is a $C_1$-$C_6$ alkylene; B is —O— or —S—; and the countercation M is selected from Na+ and K+.

12. The organosiloxane compound of claim 1, wherein $R^1$, $R^2$, $R^3$, and $R^4$ are methyl; X is $SO_3M$; L is a $C_3$ alkylene; B is —S—; and the countercation M is Na+.

13. The organosiloxane compound of claim 1, wherein B is —S— and X is —$CO_2M$ or —$SO_3M$.

14. The organosiloxane compound of claim 1, wherein B is —O— and X is —$CO_2M$ or —$SO_3M$.

15. The firefighting foam composition of claim 7, wherein the firefighting foam composition is free of fluorinated surfactants.

16. The firefighting foam composition of claim 15, comprising one or more surfactants selected from alkylglycosides, alkyl polyglycosides, alkyl sulfobetaines and alkyl sulfates.

17. A method of forming a firefighting foam, comprising:
mixing the firefighting foam composition of claim 7 with water to form a use strength solution; and
aerating the use strength solution to form the firefighting foam.

18. A method of fighting a fire comprising administering a firefighting foam produced according to the method of claim 16 to the fire.

19. The firefighting foam composition according to claim 7, comprising one or more non-ionic surfactants selected from polyoxyethylene derivatives of alkylphenols, linear or branched alcohols, fatty acids, alkylamines, alkylamides, and acetylenic glycols, alkyl glycosides and alkyl polyglycosides.

20. The firefighting foam composition according to claim 7, comprising one or more anionic surfactants selected from alkyl carboxylates and alkyl sulfates.

21. The firefighting foam composition according to claim 8, wherein the one or more solvents is selected from hexylene glycol, butyl carbitol, butyl cellulose, polyethylene glycol, methyl diproxitol, propylene glycol, propylene glycol n-propyl ether, and tripropylene glycol methyl ether.

22. The firefighting foam composition according to claim 8, wherein the one or more stabilizers is selected from ethylene glycol monoalkyl ethers, polyethylene glycol, diethylene glycol monoalkyl ethers, propylene glycol, dipropylene glycol monoalkyl ethers, triethylene glycol monoalkyl ethers, 1-butoxyethoxy-2-propanol, glycerine, hexylene glycol, and trimethylglycine.

23. The organosiloxane compound of claim 1, wherein B is —S—; L is a $C_2$ or $C_3$ alkylene; X is $SO_3M$; and M is Na+ and/or K+.

24. A firefighting foam composition comprising about 0.01% to about 25% of the organosiloxane compound according to claim 23;
- one or more surfactants selected from alkylglycosides, alkyl polyglycosides, alkyl sulfobetaines and alkyl sulfates;
- and, optionally, the one or more solvents is selected from hexylene glycol, butyl carbitol, butyl cellulose, polyethylene glycol, methyl diproxitol, propylene glycol, propylene glycol n-propyl ether, and tripropylene glycol methyl ether;
- wherein the firefighting foam composition is free of fluorinated surfactants.

* * * * *